United States Patent [19]

Wadhwa et al.

[11] Patent Number: 5,017,681

[45] Date of Patent: May 21, 1991

[54] HIGH PERFORMANCE THERMALLY STABLE POLYBENZIMIDAZOLE FILM

[75] Inventors: Lachman Wadhwa, North Plainfield; Michel Bitritto, Summit, both of N.J.; Edward J. Powers, Charlotte, N.C.

[73] Assignee: Hoechst Celanese Corp., Somerville, N.J.

[21] Appl. No.: 478,163

[22] Filed: Feb. 8, 1990

Related U.S. Application Data

[62] Division of Ser. No. 98,440, Sep. 18, 1987, Pat. No. 4,927,909.

[51] Int. Cl.$^5$ .............................................. C08G 73/18
[52] U.S. Cl. .................................... 528/342; 528/183; 528/327; 528/331; 528/341
[58] Field of Search ............... 528/342, 331, 183, 327, 528/341

[56] References Cited

U.S. PATENT DOCUMENTS 4,927,909  5/1990  Wadhwa et al. .................... 528/342

*Primary Examiner*—Harold D. Anderson
*Attorney, Agent, or Firm*—Joseph M. Mazzarese

[57] ABSTRACT

The instant invention involves a process for producing continuous polybenzimidazole films. The process is comprised of the following steps:
(a) preparing a solvent solution of a polybenzimidazole polymer;
(b) continuously casting the solution upon a support;
(c) evaporating a sufficient amount of the solvent to form a self-supporting film in an oven;
(d) washing the film in a nonsolvent;
(e) removing the film from the support; and
(f) continuously collecting the continuous film.

9 Claims, 1 Drawing Sheet

HIGH PERFORMANCE THERMALLY STABLE POLYBENZIMIDAZOLE FILM

This is a continuation of copending application(s) Ser. No. 07/098,440 filed on Sept. 18, 1987, now U.S. Pat. No. 4,927,909.

BACKGROUND OF INVENTION

1. Field of Invention

This invention relates to a process for preparing films. More particularly, the invention relates to the production of polybenzimidazole films.

2. Prior Art

Commonly assigned U.S. Pat. No. 3,836,500, discloses a means for improving the color stability of polybenzimidazole articles. According to the patent, films can be formed by casting from a polybenzimidazole solution. However, no casting conditions are disclosed, nor whether continuous, pinhole-free films are formed.

In commonly assigned U.S. Pat. No. 4,048,139, polybenzimidazole films are formed by casting a polybenzimidazole solution and then evaporating the polybenzimidazole solvent. However, a continuous process for preparing continuous, pinhole-free polybenzimidazole films is not disclosed.

Prior to the instant invention, there was no commercially feasible process for preparing polybenzimidazole films. In the prior art, solvent evaporation was conducted at such high temperatures that, after part of the solvent was removed, a skin of what appeared to be a polymer-solvent complex formed which made the subsequent removal of the remaining solvent much more difficult. Drying times tended to be very long and the films usually had to be washed for up to 24 hours to remove residual solvent from the film. Consequently, it was commercially infeasible to manufacture polybenzimidazole films using the known prior art processes. In addition, there was no known continuous process for preparing continuous, pinhole-free polybenzimidazole films.

Accordingly, it is an object of this invention to prepare continuous polybenzimidazole films.

It is another object of this invention to prepare continuous polybenzimidazole films in a continuous process.

It is also an object of this invention to prepare polybenzimidazole films which are pinhole-free.

It is a further object of this invention to prepare polybenzimidazole films that are useful in high temperature applications.

These and other objects are obtained by employing the process of the instant invention.

SUMMARY OF INVENTION

The present invention constitutes a process for producing a continuous polybenzimidazole film and comprises the following steps:

(a) preparing a solvent solution of a polybenzimidazole polymer
(b) casting a wet film from the polybenzimidazole solution upon a support;
(c) evaporating a sufficient amount of the solvent in an oven to form a self-supporting film;
(d) washing the film;
(e) removing the film from the support; and
(f) continuously collecting the polybenzimidazole film.

The process of the instant invention permits the continuous preparation of polybenzimidazole films which can be used particularly in high temperature and separatory applications.

DETAILED DESCRIPTION OF INVENTION

A. The Starting Material

Figure 1:
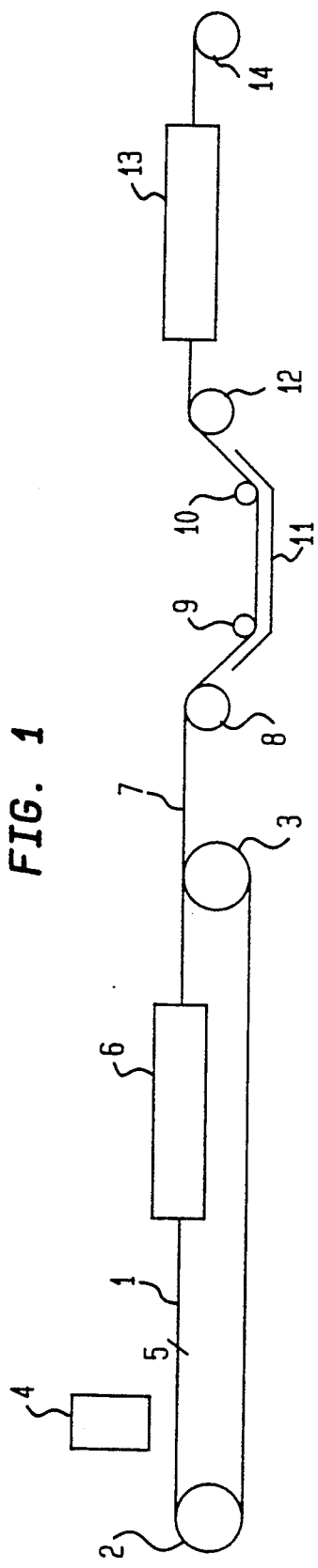
FIG. 1 is a diagrammatic view of one embodiment of a process for preparing a continuous polybenzimidazole film.

The polymeric material used to form the films of the present invention is a linear polybenzimidazole. Polybenzimidazoles are a known class of heterocyclic polymers. Typical polymers of this class and their preparation are more fully described in U.S. Pat. Nos. 2,895,948, RE 26,065, and in the Journal of Polymer Science, Vol. 50, pages 511–539 (1961) which are herein incorporated by reference. The polybenzimidazoles consist essentially of recurring units of the following Formulas I and II. Formula I is:

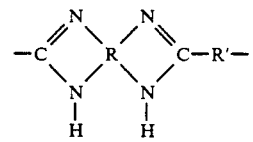

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:
wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formula I wherein R' is an aromatic ring or a heterocyclic ring and Formula II.

As set forth in U.S.Pat. No. RE 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heterocyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimdiazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2'2"-(m-phenylene)-5'-5"-di(benzimidazole)-propane-2,2;
poly-2'2"-(m-phenylene)-5',-5"-di(benzimidazole)-ethylene-1,2 where the double bonds of the ethylene groups are intact in the final polymer.

The preferred polybenzimidazole for use in the present process is one prepared from poly-2,2'-(m-phenylene)-5,5'-bibenzimdiazole, the recurring unit of which is:

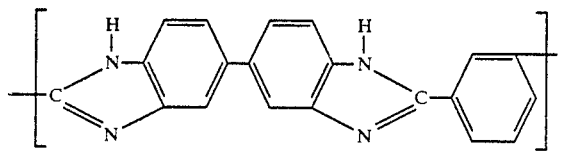

Any polymerization process known to those skilled in the art may be employed to prepare the polybenzimidazoles which may then be formed into a film according to the process of this invention. Representative techniques for preparing the polybenzimidazoles are disclosed in U.S. Pat. Nos. 3,509,108, 3,549,603, 3,551,389, 4,312,976, 4,452,971, 4,452,972, 4,483,977 and 4,485,232 which are herein incorporated by reference.

With respect to aromatic polybenzimidazoles, preferably equimolar quantities of the monomeric tetraamine and dicarboxyl compound are introduced into a first stage melt polymerization reaction zone and heated at a temperature above about 200° C., preferably at least about 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3. The inherent viscosity (I.V.) as used herein is determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, preferably between about 0.6 and about 1.4, and most preferably between about 0.8 and about 1.0.

The temperature employed in the second stage is at least 250° C., preferably at least 325° C., and more preferably from about 350° C., to 425° C. The second stage reaction generally takes at least 0.5 hour, and preferably from about 1 to 4 hours or more. It is, of course, also possible to prepare the instant polymers via a one-step reaction. However, the previously described two-step process is preferred.

B. The Polymer Casting Solution

The solvents utilized to form the polybenzimidazole polymer casting solutions from which films are cast include those solvents which are commonly recognized as being capable of dissolving the particular polybenzimidazole polymer. For instance, the solvents may be selected from those commonly utilized in the formation of polybenzimidazole dry spinning solutions. Illustrative examples of preferred solvents include N,N-dimethylacetamide, N,N-dimethylformamide, dimethylsulfoxide, and N-methyl-2-pyrrolidone. The particularly preferred solvent is N,N-dimethylacetamide. Additional representative solvents include formic acid, acetic acid, and sulfuric acid.

The polymer casting solutions may be prepared first by dissolving the polybenzimidazole polymer in a solvent. Generally, the casting solution will contain about 5 to about 30 percent by weight polybenzimidazole polymer, based on the total weight of the solution, preferably from about 20 to about 27 percent by weight and most preferably about 21 to about 25 percent by weight. The quantity of polybenzimidazole dissolved in the solvent should be such that the casting solution has a viscosity of about 50 to 4,000 poise at 30° C., and preferably about 400 to 600 poise.

One suitable means for dissolving the polymer in the solvent is by mixing the materials at a temperature above the normal boiling point of the solvent, for example, about 25° C. to 120° C. above such boiling point, and at a pressure of 2 to 15 atmospheres for a period of 1 to 5 hours in a closed container. The resulting solutions are preferably filtered to remove any undissolved polymer. A minor amount of lithium chloride optionally may be provided in the solution in accordance with the teachings of commonly-assigned U.S. Patent No. 3,502,606. The lithium chloride serves to prevent the polybenzimidazole polymer from phasing out of the solution upon standing for extended periods of time.

C. Film Formation

The polybenzimidazole solution prepared above is cast onto a support to form a film Any support can be used as long as it is essentially flat, non-woven, and permits the polybenzimidazole film to be readily separated or removed without tearing the film. Examples of the materials from which the supports can be fabricated include metals such as stainless steel and aluminum, and plastics such as teflon and the various polyesters including preferably polyethylene terephthalate. It is preferred that the surface of the support be flexible enough to rotate continuously so it may be used in the form of a conveyor belt which permits continuous films to be prepared. The solution is cast at a line speed of about 3 ft. to about 20 ft. per minute, preferably about 5 ft. to about 10 ft. per minute and at a wet film thickness of about 1.0 to about 10 mils, preferably about 1.5 to 3.0 mils.

After the polybenzimidazole solution is deposited on the support as a wet film, the wet film is passed under a stationary blade to insure a uniform wet film thickness. Any of the blades known to be suitable for film casting by those skilled in the art may be employed. The casting blade can be located about 1.0 to about 10.0 mils above the support, preferably about 3 to 6 mils above the support surface.

After the wet film is passed under the blade, it is introduced into an oven. Within the oven, air is blown over the wet film at a speed of about 500 to about 1500 ft. per minute and preferably about 1,200 ft. per minute in order to evaporate the solvent. The air can be at a temperature less than or equal to the temperature of the oven. The oven is maintained at a temperature in the range of about 40° C. to 125° C. and preferably about 90° C. to about 110° C. Any type of commercially available oven can be used as long as the support surface for the film can be passed through one end and out the other end of the oven.

The temperature of the oven is very important in the formation of the film. If the temperature is too low, evaporation of the solvent will take long periods of time. If, however, the temperature is too high, the film formation process is adversely affected. High temperatures (that is temperatures above about 125° C.) make it difficult to remove residual amounts of solvent because a skin or polymer-solvent complex is apparently formed at elevated temperatures and thereby inhibits the evaporation of the residual solvent.

The wet film is held in the oven for a period of time sufficient to permit enough solvent to be evaporated so that a self-supporting film is formed by the time the film exits the oven. As used herein, the term "self-supporting film" refers to a film that has a physically stable shape and is dimensionally stable if removed from its support.

The residence time in the oven is dependant upon the temperature of the oven, the line speed of the support, and the length of the oven. The interrelationship between the temperature, the line speed, and the length of the oven must be taken into account in determining the optimum oven length, oven temperature, and line speed so that a sufficient amount of solvent can be removed. The higher the temperature, the shorter the oven's length has to be, and the shorter the residence time will be. Generally, the oven is about 10 ft. long, the temperature is about 110° C. and the residence time is about 1 to about 4 minutes.

After the self-supporting film exits from the oven, it can be removed from its support and wound onto a roll. If the support is not in the form of a continuously rotating belt, it will be necessary to take up the support onto one roll while the film is wound onto another roll.

Either before or after the film is separated from its support or is collected, it can be washed to remove residual amounts of solvent. Preferably, the film is washed before being separated from its support because washing facilitates the removal of the film from the support. Any non-solvent for the polybenzimidazole polymer which is capable of removing residual quantities of the polybenzimidazole solvent can be the wash solvent.

Exemplary non-solvent liquids include polyhydroxy alcohols having two to three hydroxy groups and two to six carbon atoms. Representative polyhydroxy aliphatic alcohols for use in the present invention include glycols, such as ethylene glycol, propylene glycol, 1,3-propanediol, alpha-butylene glycol, beta-butylene glycol, 1,4-butanediol, diethylene glycol, triethylene glycol and 1,6-hexanediol. Other polyhydroxy alipathic alcohols, such as glycerol, may likewise be selected. The preferred polyhydroxy aliphatic alcohols are ethylene glycol, glycerol, and beta-butylene glycol. Mono- and dialkyl ethers of ethylene glycol marketed under the trademark Cellosolve may also be selected. Ketones, such as acetone and methyl ethyl ketone, aromatics, such as benzene and toluene, and chlorinated aliphatics, such as chloroform and methylene chloride, may also be employed. Known plasticizers for the polymer, such as benzylalcohol, are also suitable non-solvents for polybenzimidazole for use in the present invention. Preferably, the non-solvent is aqueous in nature, and most preferably is water.

The film can be washed by spraying with the non-solvent or by introduction into a bath containing the non-solvent. The film should remain in the bath for a period of between 1 and 7 minutes, preferably about 2 to about 4 minutes. A bath length of about 20 feet is suitable for line speeds in the range of about 3 to about 20 feet per minute. If the film is sprayed, it should be sprayed with the non-solvent for 1 to 7 minutes and preferably 2 to 4 minutes. Although only one side may be sprayed, it is preferred to spray both sides of the film simultaneously so that as much of the residual solvent as possible is removed.

After the film is washed, it is dried by any convenient means, and preferably is dried by being passed through an oven before being taken up. The same type of oven used earlier to form the self-supporting film is usually employed. The temperature of the oven will depend upon the non-solvent used to wash the film. The temperature should be at or above the boiling point of the non-solvent but preferably below a temperature at which the film will discolor. Generally, discoloration of the film can be avoided if the temperature is kept below about 300° C. When the non-solvent is water, the temperature of the oven should be about 100° C. It is preferred to direct air over the film while it is in the oven to accelerate the evaporation of the non-solvent. The air is usually at the same temperature of the oven and moving at a speed of about 500 to 1,500 feet per minute and preferably about 1,200 feet per minute. The film remains in the oven for a sufficient time to evaporate the non-solvent. Generally, this will take between 1 to 4 minutes. With line speeds of 3 to 20 feet per minute, an oven 10 feet in length will usually be sufficient. After the film is dried in the oven, it is collected and stored.

It is also possible to chemically treat the film with phosphoric acid either before or after it is collected. A wash bath containing a non-solvent for polybenzimidazole and up to about 15 percent, preferably about 1.0 to about 10.0 percent, and most preferably about 2.0 to about 5.0 percent phosphoric acid by weight based on the total weight of the bath can be used instead of a pure wash solution of a non-solvent as described above. Preferably, the non-solvent is a polyhydroxy alcohol or water and most preferably is water. After the film is passed through the phosphoric acid wash bath, it is dried in an oven in the same manner as the washed films described above are dried, and then collected and stored.

Washing or chemically treating the film enhances the film's heat degradation resistance. A film that is not washed or chemically treated will generally have a heat degradation temperature of about 500° C. A washed or chemically treated film, on the other hand, will generally have a heat degradation temperature of over 600° C. and sometimes over 700° C. or 800° C.

Figure 2:
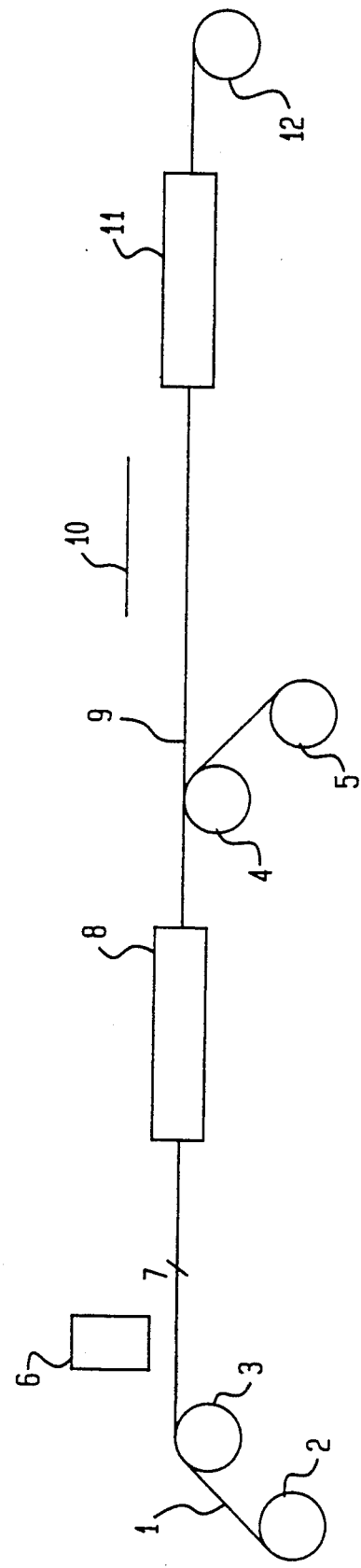
FIG. 2 is a diagrammatic view of another embodiment of a process for preparing a continuous polybenzimidazole film.

Two embodiments of this invention are depicted by FIGS. 1 and 2. In FIG. 1, support 1 is wrapped around rolls 2 and 3 so that the support continuously rotates like a conveyor belt. The polybenzimidazole solution is contained in dispenser 4 from which the solution is cast as a wet film onto support 1. After being cast, the wet film is passed under a blade 5 to insure a uniform thickness of the polybenzimidazole film.

After passing under the blade, the wet film enters one end of oven 6. While in the oven, the solution is evaporated and a self-supporting film 7 is formed. The film 7 is separated from support 1 and guided by rollers 8, 9 and 10 through non-solvent bath 11 to remove residual solvent. Preferably, the film is washed after it exits oven 6 and before it is separated from its support since washing facilitates the removal of the film from the support. (It should be understood that the washing of the film as shown in FIG. 1 can be eliminated or conducted after the film is taken up. When the wash step is eliminated or performed later, film 7 is taken up on roll 14 immediately after it is separated from support 1.)

Self-supporting film 7 exits bath 11 and is guided by roll 12 into oven 13. Oven 13 is the same type of oven as oven 6. In oven 13 the non-solvent from bath 11 that is on film 7 is evaporated. After exiting from oven 13, film 7 is collected on roll 14.

FIG. 2 is another embodiment of this invention. This embodiment is the same as the one depicted in FIG. 1, except that the support does not continuously rotate, and the film is spray washed instead of being passed through a wash bath. In FIG. 2, support 1 is fed from roll 2 to rolls 3 and 4 and taken up on roll 5. The polybenzimidazole solution is contained in dispenser 6 from which the solution is cast as a wet film onto support 1. After being cast, the wet film is passed under blade 7 and then enters oven 8 where a sufficient amount of solvent is evaporated to form a self-supporting film 9. After passing over roll 4 and having film 9 separated from its surface, the support is taken up on roll 5. After film 9 is separated from support 1, it is sprayed with a non-solvent by sprayer 10 and then passed through oven 11 and taken up on roll 12.

It will be readily apparent to one skilled in the art that the process depicted in FIG. 2 can be modified in several ways. For example, the spraying step can be eliminated or conducted later, in which case film 9 is taken up immediately on roll 12 after being separated from support 1. In addition, another spray can be applied to the bottom surface of the film so that the film is sprayed on both sides.

The films produced by the instant invention are pinhole-free and do not contain discontinuities, such as craters. The term "pinhole-free film" refers to a film having no macroscsopic holes. The films may be utilized in a wide variety of end uses. For example, since the films decompose at temperatures in excess of 500° C., they can be used in high temperature applications, such as being used as fire insulators. The films may also be applied as coatings for glass and metal and as coverings for electrical wiring.

The invention is illustrated by the following examples in which all parts and percents are by weight.

EXAMPLE 1

A polybenzimidazole solution containing 21 percent solids in dimethylacetamide was prepared from a poly-2,2'-(m-phenylene)-5,5'-bibenzimidazole polymer having an inherent viscosity of 0.97. The dope was cast at room temperature upon a 3 mil thick Mylar support that was 13 inches wide, had raised edges, and was continuously rotating on two rolls so that a continuous film could be made. The wet film was cast at a line speed of 5 feet per minute and passed under a No. 1 doctor blade. The setting between the Mylar surface and the edge of the doctor blade was 4 mils. The wet film was passed into a 10 foot 125° oven for two minutes to form a self-supporting film. Air with a velocity of approximately 1,200 feet per minute and at a temperature of 125° C. was passed over the wet film while the film was in the oven. After being removed from the oven, the film was taken up on a roll along with the Mylar surface. The finished film exhibited a thickness of approximately 1.0 mil.

Subsequently, three sheets measuring 17 inches by 12 inches were cut from the roll. One of the sheets was allowed to air dry for three days.

The second sheet was rinsed for ten minutes in deionized water at 20° to 22° C. and placed on a glass plate measuring 10 inches by 15 inches. The film was clamped glass plate, the water was drained off and the glass plate with the film attached was placed in a forced air oven at 100° C. for ten minutes. Upon removal from the oven, the clamps were removed and the edges trimmed.

The third sheet of film was soaked for ten minutes in a 22° C. bath containing 2.0 percent by weight phosphoric acid. The film was soaked and then rinsed with deionized water for 10 minutes at 20° C. to 22° C. Next, the film was clamped on a 10 inch by 15 inch glass plate, the remaining water was drained off, and the film on the glass plate was dried in a 100° C. forced air oven for ten minutes. The film was then removed from the glass plate and the edges trimmed where the clamps had been located.

The three sheets were then tested to determine the decomposition temperature using Thermogravametric (TGA) analysis. The TGA analysis of the films was carried out in air at 20° C./min in the temperature range of 25° to 900° C. The sample that was air dried for three days decomposed at 515° C. The water washed sample decomposed at 615° C. and the phosphoric acid treated sample decomposed at 820° C. The polybenzimidazole polymer from which the film was prepared decomposed at 595° C.

Microscopic analysis using a Leitz Ortholux optical microscope showed that there were no apparent structural differences between the three films. Polarized light observation indicated no major differences in the three films, and no pinholes were observed.

EXAMPLE 2

A polybenzimidazole dope having a 25 percent dope solids level in demethylacetamide was prepared from a poly-2,2'-(m-phenylene)-5,5'-bibenzimdiazole polymer having an inherent viscosity of 0.68. The dope was cast at a temperature of 22° C. and a line speed of five feet per minute on a continuously rotating Mylar support having a width of 13 inches. The wet film was passed under a No. 1 doctor blade to insure a uniform film thickness. The blade of the knife was five mils above the Mylar support surface. The wet film was introduced into a 10 foot long 110° C. oven and remained in the oven for two minutes to form a self-supporting film. Within the oven, air at a temperature of about 110° C. was passed over the wet film surface at a velocity of 1,200 feet per minute.

Upon exiting the oven, the film was separated from its support and passed at a line speed of 5 feet per minute through a 20 foot long bath containing water to remove some of the residual dimethylacetamide. After exiting the bath, the film was passed through a 10 foot long 100° C. oven. Air with a velocity of 1,200 feet per minute and at a temperature of 100° C. was passed over the film surface to accelerate the evaporation of water. After leaving the oven, the film was collected. The resulting film was smooth, pinhole-free and had a thickness of about 1.5 mils. The film was subsequently wrapped around electrical wires to serve as an insulating sheath.

EXAMPLE 3

Example 2 was repeated except that the gap between the blade and the support surface was six mils. The resulting film had a thickness of approximately 1.8 to 2.0 mils, was pinhole-free and smooth.

EXAMPLE 4

Example 2 was repeated except that the polybenzimidazole dope had an inherent viscosity of 0.70 to 0.75 and the solids level was 25.6 percent and the blade gap was 6.5 mils. A good, pinhole-free film resulted.

What is claimed is:

1. A continuous polybenzimidazole film, having no macroscopic holes, that does not decompose due to heat at a temperature below at least about 500° C.

2. The film of claim 1 wherein the polybenzimidazole polymer consists essentially of recurring units of the formula:

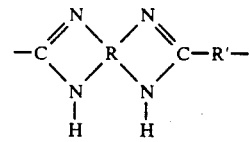

wherein R is a tetravalent aromatic nucleus with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

3. The film of claim 1 wherein the polybenzimidazole polymer consists essentially of the recurring units of the formula:

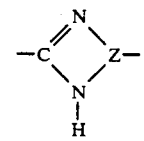

wherein Z is an aromatic nucleus having the nitrogen atoms forming the benzimidazole ring paired upon adjacent carbon atoms of the aromatic nucleus.

4. The film of claim 1 wherein the polybenzimidazole polymer is poly-2,2'-(m-phenylene)-5,5'-bibenzimidazole.

5. The film of claim 1 wherein the polybenzimidazole polymer from which the film is made has an inherent viscosity of about 0.6 to about 1.4, as determined from a solution of 0.4 g of said polymer in 100 ml of 97% $H_2SO_4$ at 25° C.

6. The film of claim 1 wherein the polybenzimidazole polymer from which the film is made has an inherent viscosity of about 0.8 to about 1.0, as determined from a solution of 0.4 g of said polymer in 100 ml of 97% $H_2SO_4$ at 25° C.

7. The film of claim 1 wherein the temperature below which the film will not decompose due to heat is at least about 600° C.

8. The film of claim 1 wherein the temperature below which the film will not decompose due to heat is over 700° C.

9. The film of claim 1 wherein the temperature below which the film will not decompose due to heat is over 800° C.

* * * * *